United States Patent
Yi

(10) Patent No.: US 8,790,022 B2
(45) Date of Patent: Jul. 29, 2014

(54) PLUGGABLE DATA COMMUNICATION MODULE WITH SLIDER-CRANK DELATCH MECHANISM

(71) Applicant: Avago Technologies General IP (Singapore) Pte. Ltd., Singapore (SG)

(72) Inventor: Robert Yi, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 36 days.

(21) Appl. No.: 13/718,785

(22) Filed: Dec. 18, 2012

(65) Prior Publication Data

US 2014/0169749 A1    Jun. 19, 2014

(51) Int. Cl.
    *G02B 6/36*          (2006.01)
    *G02B 6/43*          (2006.01)
    *G02B 6/44*          (2006.01)

(52) U.S. Cl.
    CPC .................................. *G02B 6/4439* (2013.01)
    USPC ........................................................ 385/89

(58) Field of Classification Search
    CPC .................................................. G02B 6/4261
    USPC .......................................................... 385/89
    See application file for complete search history.

(56) References Cited

U.S. PATENT DOCUMENTS

| | | | |
|---|---|---|---|
| 6,692,159 B2 | 2/2004 | Chiu et al. | |
| 7,325,975 B2 | 2/2008 | Yamada et al. | |
| 7,837,400 B2 | 11/2010 | Liu et al. | |
| 8,113,723 B2 * | 2/2012 | Togami et al. | 385/86 |
| 8,292,518 B2 * | 10/2012 | Togami et al. | 385/86 |
| 8,391,667 B2 * | 3/2013 | Teo et al. | 385/139 |
| 2011/0267742 A1 | 11/2011 | Togami et al. | |

FOREIGN PATENT DOCUMENTS

JP              4574594 B2     4/2012

* cited by examiner

*Primary Examiner* — Omar Rojas

(57) ABSTRACT

A delatch mechanism for disengaging a data communication module from a cage includes an actuator handle and a T-shaped crank connected at a wrist pivot to the handle and connected at a crank pivot to the module housing. The crank pivots to lift a pin out of engagement with the cage when a user pulls on the actuator handle, causing it to slide relative to the housing.

12 Claims, 5 Drawing Sheets

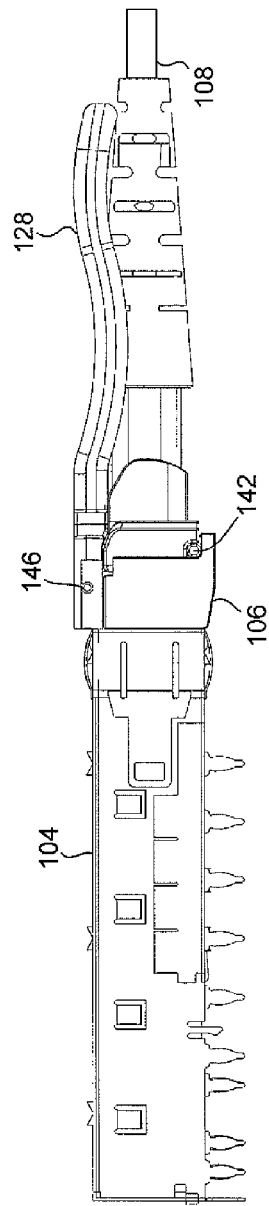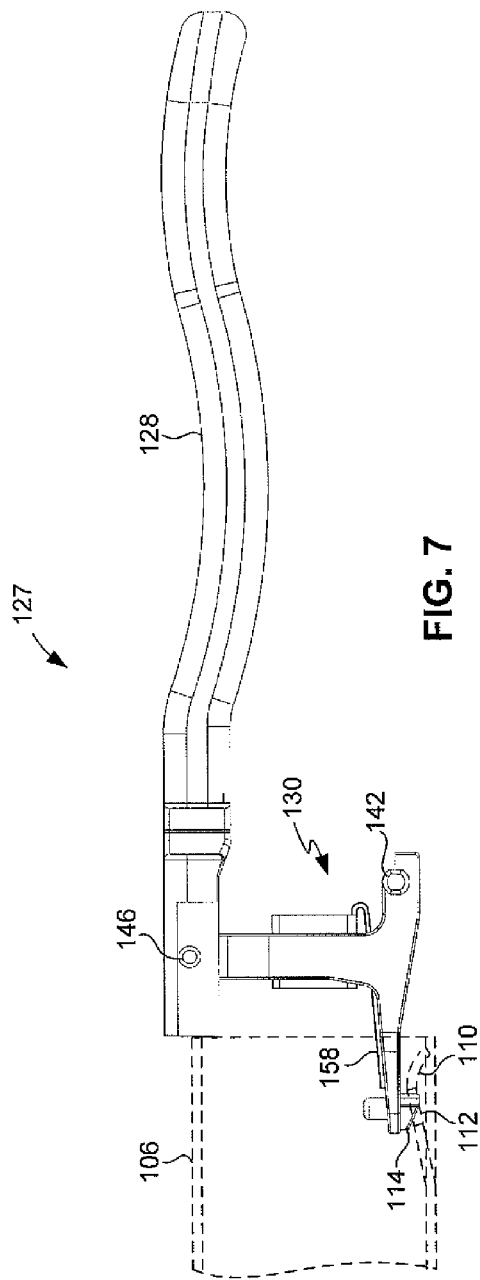

PLUGGABLE DATA COMMUNICATION MODULE WITH SLIDER-CRANK DELATCH MECHANISM

BACKGROUND

In data communication systems, it is often useful to modularize interface electronics and other interface elements in a data communication module. For example, in an optical data communication system, an opto-electronic transceiver module may include a light source such as a laser, and a light detector such as a photodiode, and may also include driver and receiver circuitry associated with the laser and photodiode. To use such an opto-electronic transceiver module, an optical fiber cable is plugged into or otherwise connected to a port in the module. Such a module also includes electrical contacts that can be coupled to an external electronic system.

Another example of a data communication module is an Ethernet transceiver module. To use an Ethernet transceiver module, an Ethernet cable, which may have an electrical rather than an optical connector, is plugged into a port in the module. The module may include signal conditioning electronics. Such a module also includes electrical contacts that can be coupled to an external electronic system.

Some data communication modules are configured to be plugged into a cage or other receptacle. A standard communication module configuration commonly referred to in the art as Small Form Factor Pluggable (SFP) includes an elongated housing having a generally rectangular profile. An SFP module is pluggable into a bay in the front panel of a metallic cage having an array of such bays. In addition to serving as an interface between an array of modules and an external electronic system, the cage provides protection against electromagnetic interference (EMI). The nose end of each module includes a mechanism that latches the module in the cage. The mechanism typically comprises a pin on the module housing and a catch on the cage. As a user pushes or inserts the module into the cage, the pin engages an opening in the catch to latch the module in place in the cage. To release or delatch the module from the cage, the user flips a pivoting bail on the module or otherwise moves a mechanism on the module to cause the pin and the catch to disengage from each other. As the bail or other user-operated mechanism is more directly involved in delatching the module from the cage rather than latching the module in the cage, the mechanism as a whole is typically referred to as a "delatch mechanism." Prior delatch mechanisms for SFP modules generally fall into two categories: moving catch and moving pin.

A moving-catch delatch mechanism delatches the pin from the catch by flexing the catch away from the pin in response to the downward motion of the bail so that the pin and catch do not interfere with each other when the module is withdrawn from the cage. Moving-catch delatch mechanisms promote manufacturing economy by minimizing the number of parts. However, moving-catch latching mechanisms suffer from dependence upon the resilience or flexibility of the catch.

A moving-pin delatch mechanism delatches the pin from the catch by causing the pin to retract into the module housing in response to the pivoting motion of the bail so that the pin and catch do not interfere with each other when the module is withdrawn from the cage. Moving-pin delatch mechanisms do not depend upon flexibility of the catch and provide low frictional resistance between the pin and catch. However, prior moving-pin delatch mechanisms can be complex, involving a substantial number of moving parts, adversely impacting manufacturing economy.

SUMMARY

Embodiments of the present invention relate to a data communication module that includes a slider-crank-based delatch mechanism. In an exemplary embodiment, a data communication module includes a module housing, module electronics configured to process data communication signals, an actuator handle, and a substantially T-shaped crank. The module housing has an elongated rectangular shape elongated in a direction of a longitudinal axis between a first end and a second end. The first end of the module housing has a module port for receiving a signal cable. The second end of the module housing has electrical contacts. The module electronics provide a processing path for the data communication signals between the module port and the electrical contacts. The actuator handle has a shape elongated in a direction of the longitudinal axis and is slideably disposed with respect to the module housing in the direction of the longitudinal axis. The substantially T-shaped crank has a first arm structure and a second arm structure oriented substantially perpendicularly to the first arm structure. The first arm structure has a first end pivotally connected to the module housing at a crank pivot and a second end having a pin extending therefrom. The second arm structure has a first end fixedly connected to a portion of the first arm structure between the first end of the first arm structure and the second end of the first arm structure. The second arm structure has a second end pivotally connected to the actuator handle at a wrist pivot. The wrist pivot is slideably disposed with respect to the module housing in the direction of the longitudinal axis.

In the exemplary embodiment, a method for delatching the above-described data communication module from a cage includes sliding the actuator handle in the direction of the longitudinal axis from a handle latched position to a handle delatched position. In response to this sliding of the actuator handle, the substantially T-shaped crank pivots on a crank pivot from a crank latched position to a crank delatched position. In response to this pivoting of the crank, the pin retracts toward the module housing from a pin latched position in which the pin engages a portion of the cage to a pin delatched position in which the pin disengages from the portion of the cage. Once delatched in this manner, a user can withdraw or extract the data communication module from the cage.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 6 is a side elevation view of the data communication module and cage of FIG. 2, showing the actuator handle in a latched position.

FIG. 7 is a side elevation view of the delatch mechanism of the data communication module of FIG. 6.

DETAILED DESCRIPTION

Figure 1:
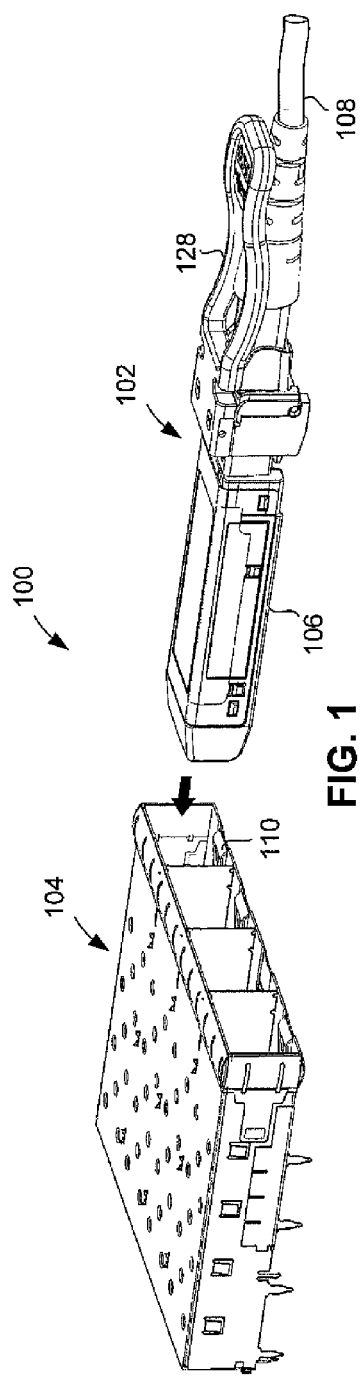
FIG. 1 is a perspective view of a data communication module system in accordance with an exemplary embodiment of the invention, showing a data communication module being inserted into a cage.

As illustrated in FIG. 1, in an illustrative or exemplary embodiment of the invention, a data communication module system 100 comprises a data communication module 102 and an electromagnetic interference (EMI) cage 104. In the manner described below, data communication module 102 can be secured or latched within EMI cage 104 and then released or delatched so that it can be removed from EMI cage 104.

Data communication module 102 can include an elongated module housing 106 having a generally rectangular cross-sectional shape. A signal cable 108 (e.g., optical fiber cable) extends from the rearward end of module housing 106. Data communication module 102 can be inserted or plugged into a bay of EMI cage 104 by inserting the forward end of module housing 106 into the bay opening, as indicated by the arrow in FIG. 1.

Figure 2:
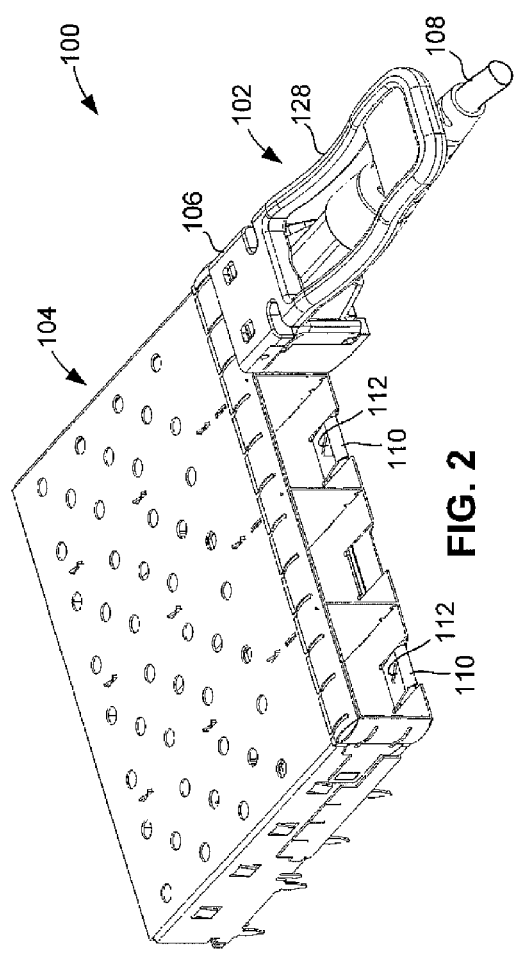
FIG. 2 is similar to FIG. 1, showing the data communication module fully inserted and latched in the cage.

As illustrated in FIG. 2, within each bay in EMI cage 104 is a tongue 110. Tongue 110 is formed of the same sheet metal as the surrounding portions of EMI cage 104 and is angled or bowed inwardly within the bay to provide a ramp-like surface. Tongue 110 has an aperture 112. Data communication module 102 can be inserted or plugged into a bay until it reaches the fully inserted position shown in FIG. 2. As data communication module 102 reaches this position, a latch pin 114 (FIG. 3) on the underside of data communication module slides over tongue 110 and becomes seated within aperture 112. In this position, the engagement between latch pin 114 and aperture 112 of tongue 110 retains or latches data communication module 102 in EMI cage 104.

Figure 4:
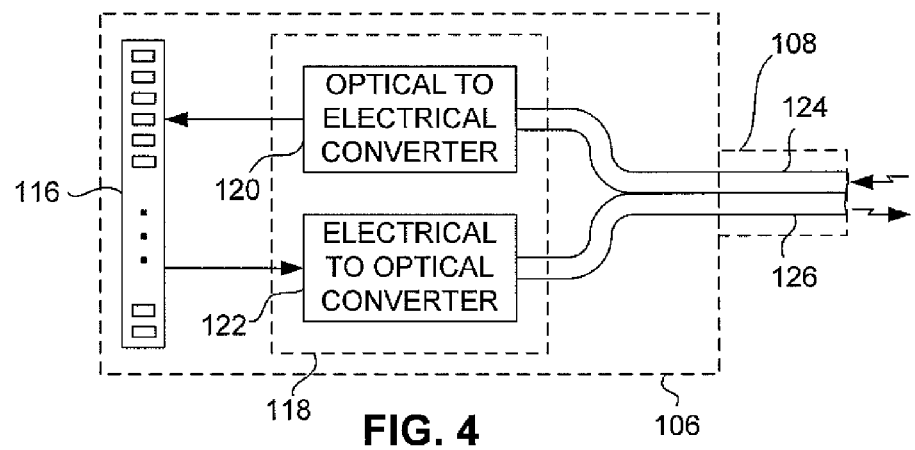
FIG. 4 is a block diagram of the processing path for the data communication signals in the data communication module of FIGS. 1-2.

When fully inserted and latched in a bay of EMI cage 104, data communication module 102 can communicate data signals with an external system (not shown), such as a switching system or processing system, via EMI cage 104. As illustrated in FIG. 4, an electrical contact array 116 at the forward end of module housing 106 mates with electrical contacts within EMI cage 104 when data communication module 102 is fully inserted in a bay of EMI cage 104. Also disposed within module housing 106 are module electronics 118, such as optical-to-electrical signal conversion circuitry 120 and electrical-to-optical signal conversion circuitry 122. Module electronics 118 provide a signal processing path between electrical contact array 116 and signal cable 108. More specifically, optical-to-electrical signal conversion circuitry 120 converts optical signals received via an optical fiber 124 of signal cable 108 into corresponding electrical signals and provides the electrical signals to electrical contact array 116. Similarly, electrical-to-optical signal conversion circuitry 122 converts electrical signals received via electrical contact array 116 into corresponding optical signals and provides the optical signals to another optical fiber 126 of signal cable 108.

The above-described rectangular shape, operation and other characteristics of data communication module 102 define a type or category of data communication module commonly referred to as Small Form Factor Pluggable (SFP). Variations of the SFP module type are known, such as SFP+, but all such data communication modules having the above-described characteristics are of the family of module types generally referred to as SFP. Although in the exemplary embodiment described herein data communication module 102 is of an SFP type that bidirectionally processes optical signals in the manner of a transceiver, in other embodiments data communication modules can be of any other SFP type or similar type that processes optical or electrical signals or combinations of optical and electrical signals, either bidirectionally in the manner of a transceiver or unidirectionally in the manner of a transmitter or a receiver. As details of the electronic and opto-electronic element assembly within module housing 106 that provides such processing are not relevant, the assembly is not described in further detail.

Figure 3:
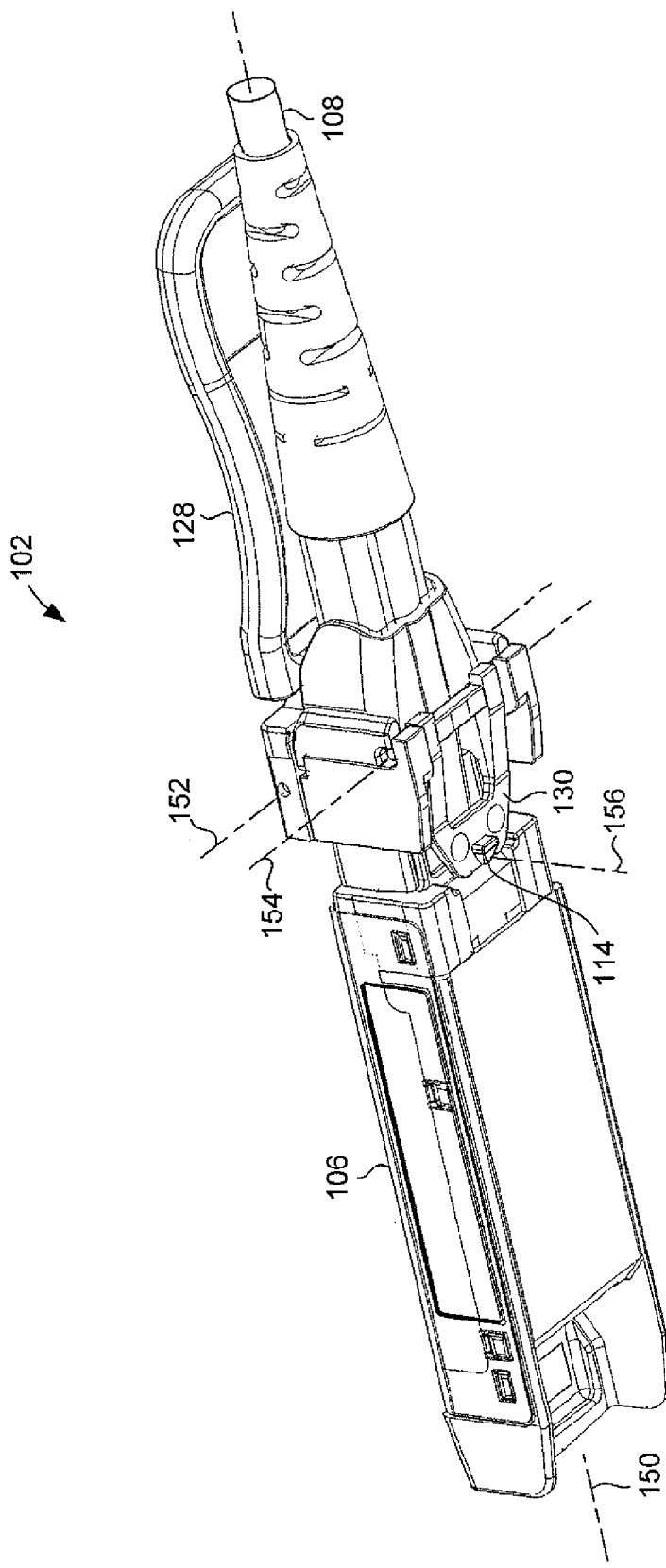
FIG. 3 is a perspective view of the bottom of the data communication module of FIGS. 1-2.
Figure 5:
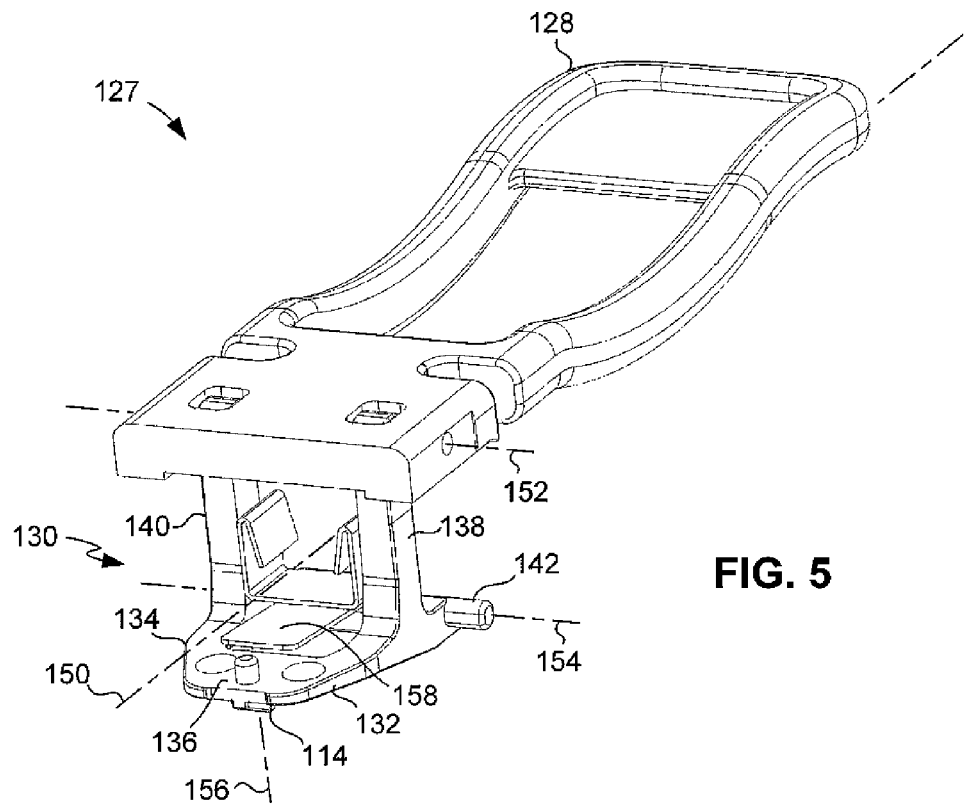
FIG. 5 is a perspective view of the delatch mechanism of the data communication module of FIGS. 1-2.

As illustrated in FIGS. 3 and 5, a delatch mechanism 127 (FIG. 5) includes an actuator handle 128 and a substantially T-shaped linkage or crank 130. Crank 130 includes a U-shaped first arm structure comprising a pair of arms 132 and 134 that meet at a cross member 136. Latch pin 114 extends from cross member 136 at this end of the first arm structure. Crank 130 further includes a second arm structure comprising another pair of arms 138 and 140. It should be understood that the term "crank" or "slider-crank" is used herein for convenience, and the term by itself is not intended to imply any structural or operational characteristics other than those described herein with regard to the exemplary embodiment.

The ends of arms 132 and 134 opposite the ends from which latch pin 114 extends are connected to a crank pin 142 (FIG. 5). Crank pin 142 is rotatable within corresponding bores (not separately shown) in module housing 106 to define a crank pivot that pivotally connects the first arm structure to module housing 106.

The pair of arms 138 and 140 defining the second arm structure extend in a direction substantially perpendicular to the pair of arms 132 and 134 defining the first arm structure. Note that the mutually perpendicular arrangement of the first and second arm structures defines the "T" shape (see FIGS. 7 and 9) of the substantially T-shaped crank 130. The pair of arms 138 and 140 extend from a portion of the first arm structure between its opposing ends to a wrist pivot defined by a wrist pin 146 (FIGS. 7 and 9) rotatable within corresponding bores (not separately shown) in actuator handle 128. The wrist pivot thus pivotally connects the second arm structure comprising arms 138 and 140 to actuator handle 128. Note that the ("T") connection between the pair of arms 132 and 134 defining the first arm structure and the pair of arms 138 and 140 defining the second arm structure is fixed or rigid.

For reference purposes, it can be noted that module housing 106 is elongated in the direction of a longitudinal axis 150. Actuator handle 128 is also elongated in the direction of longitudinal axis 150. The wrist pivot has an axis 152 that is orthogonal to longitudinal axis 150. Similarly, the crank pivot has an axis 154 that is orthogonal to longitudinal axis 150 and parallel to axis 152. Accordingly, it can also be noted (FIGS. 3 and 5) that latch pin 114 extends in a direction of another axis 156 that is substantially orthogonal to longitudinal axis 150 as well as axes 152 and 154.

In the latched position or state illustrated in FIGS. 6-7, latch pin 114 is engaged with aperture 112 of tongue 110.

Accordingly, a portion of data communication module 102 is latched in EMI cage 104 and resists removal from EMI cage 104. A return spring 158 has a portion that abuts and exerts a resilient bias force against cross member 136 of the first arm structure, thereby urging latch pin 114 into engagement with aperture 112. Another portion of return spring 158 bears against a portion of module housing 106 (not shown in FIG. 7 for purposes of clarity). Return spring 158 thus biases crank 130 with respect to module housing 106.

Figure 8:
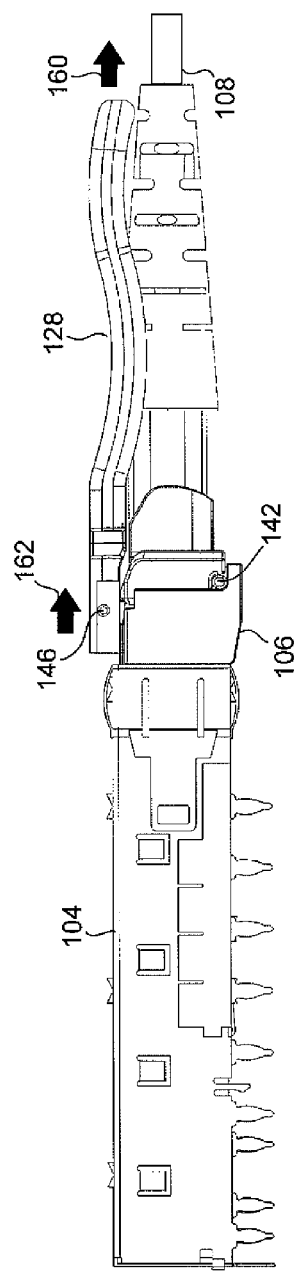
FIG. 8 is a side elevation view of the data communication module and cage of FIG. 2, showing the actuator handle in a delatched position.
Figure 9:
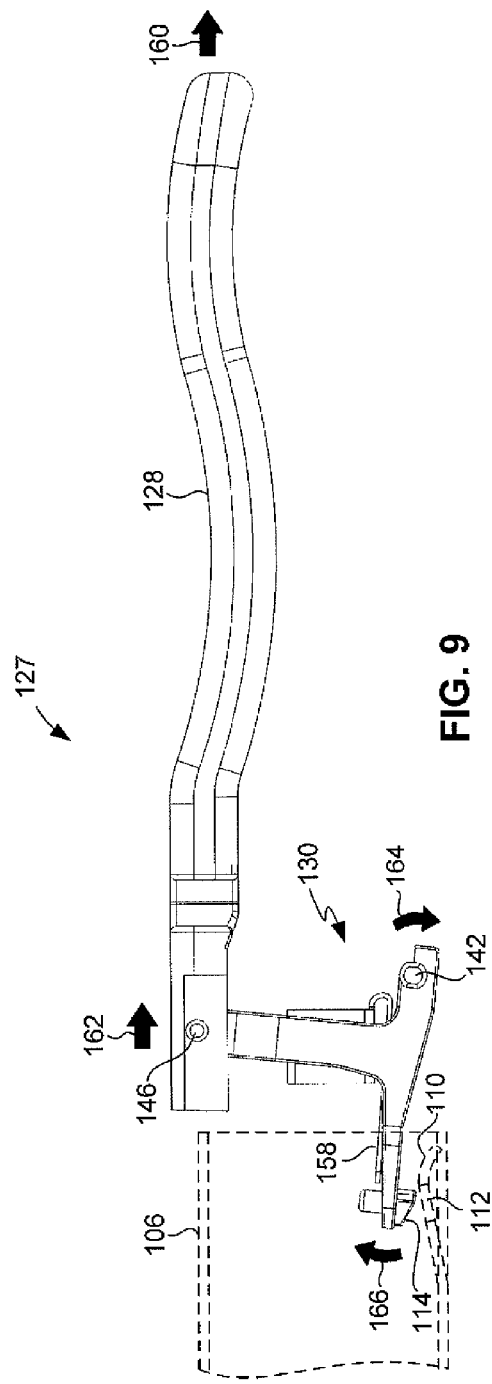
FIG. 9 is a side elevation view of the delatch mechanism of the data communication module of FIG. 8.

As illustrated in FIGS. 8-9, to delatch data communication module 102 from the above-described latched state, a person can exert a pulling force on actuator handle 128 in the direction of the arrows 160, i.e., in the direction of longitudinal axis 150 (FIGS. 3 and 5). In response to the pulling force, actuator handle 128 slides in the direction of arrows 160. Accordingly, the wrist pivot (defined by wrist pin 146 and corresponding bores in actuator handle 128) slides along with actuator handle 128, as indicated by the arrows 162. The wrist pivot thus slides with respect to module housing 106. Although the wrist pivot is displaced slightly in another direction as it slides in the direction of arrows 160, the wrist pivot motion is referred to herein as sliding because the motion component in such other direction is insignificant. Actuator handle 128 can slide from the "handle latched" position shown in FIGS. 6-7 to a "handle delatched" position shown in FIGS. 8-9.

In response to this sliding action of the wrist pivot, crank 130 pivots or rotates on the crank pivot (defined by crank pin 142 and corresponding bores in module housing 106). More specifically, the end of the first arm structure of crank 130 that is attached to crank pin 142 pivots in the direction indicated by the arrow 164. Crank 130 can pivot from the "crank latched" position shown in FIGS. 6-7 to a "crank delatched" position shown in FIGS. 8-9. Note that as crank 130 pivots, it compresses return spring 158 with respect to the portion of module housing 106 against which it bears. In response to this pivoting action of crank 130, latch pin 114 retracts toward housing 106 and thus disengages from aperture 112. Although latch pin 114 actually moves in an arcuate manner indicated by the arrow 166, it can be appreciated that latch pin 114 effectively retracts in the nominal direction of axis 156 (FIGS. 3 and 5) over the relatively short distance that latch pin 114 travels between the "pin latched" position shown in FIGS. 6-7 and the "pin delatched" position shown in FIGS. 8-9. Accordingly, in response to a user sliding actuator hand 128 as described above, latch pin 114 is lifted or retracted out of aperture 112, thereby delatching data communication module 102 from EMI cage 104.

With data communication module 102 delatched from EMI cage 104 as described above, a user can then withdraw or extract data communication module 102 from EMI cage 104 by continuing to pull data communication module 102 in the direction indicated by arrows 160 in FIGS. 8-9. Once data communication module 102 has been delatched from EMI cage 104 and at least slightly withdrawn from EMI cage 104, the user can release actuator handle 128. That is, the user can cease applying the above-described pulling force to handle 128. Absent such a pulling force, return spring 158 resiliently expands to exert a spring force against crank 130, thereby urging crank 130 back to the position or state shown in FIG. 7.

One or more illustrative embodiments of the invention have been described above. However, it is to be understood that the invention is defined by the appended claims and is not limited to the specific embodiments described.

What is claimed is:

1. A data communication module, comprising:
module electronics configured to process data communication signals;
a module housing, the module housing having an elongated rectangular shape elongated in a direction of a longitudinal axis between a first end and a second end, the first end of the module housing having a module port for receiving a signal cable, the second end of the module housing having electrical contacts, the module electronics providing a processing path for the data communication signals between the module port and the electrical contacts;
an actuator handle having a shape elongated in a direction of the longitudinal axis and slideably disposed with respect to the module housing in the direction of the longitudinal axis; and
a substantially T-shaped crank having a first arm structure and a second arm structure oriented substantially perpendicularly to the first arm structure, the first arm structure having a first end pivotally connected to the module housing at a crank pivot and a second end having a pin extending therefrom, the second arm structure having a first end fixedly connected to a portion of the first arm structure between the first end of the first arm structure and the second end of the first arm structure, the second arm structure having a second end pivotally connected to the actuator handle at a wrist pivot, the wrist pivot slideably disposed with respect to the module housing in the direction of the longitudinal axis.

2. The data communication module of claim 1, further comprising a return spring having a first portion fixedly connected to the module housing and a second portion abutting a portion of the T-shaped crank.

3. The data communication module of claim 1, wherein the first arm structure is substantially U-shaped with a cross member and two arms, the two arms of the first arm structure are connected to the crank pivot, and the pin extends from the cross member.

4. The data communication module of claim 3, wherein the second arm structure comprises two arms, and each of the two arms of the second arm structure is connected to a corresponding one of the two arms of the first arm structure.

5. A data communication module, comprising:
module electronics configured to process data communication signals;
a module housing, the module housing having an elongated rectangular shape elongated in a direction of a longitudinal axis between a first end and a second end, the first end of the module housing having a module port for receiving a signal cable, the second end of the module housing having electrical contacts, the module electronics providing a processing path for the data communication signals between the module port and the electrical contacts;
an actuator handle having a shape elongated in a direction of the longitudinal axis, the actuator handle slideable with respect to the module housing in the direction of the longitudinal axis between a handle latched position and a handle delatched position; and
a substantially T-shaped crank having a first arm structure and a second arm structure oriented substantially perpendicularly to the first arm portion, the first arm structure having a first end pivotally connected to the module housing at a crank pivot and a second end having a pin extending therefrom, the second arm structure having a first end fixedly connected to a portion of the first arm structure between the first end of the first arm structure and the second end of the first arm structure, the second arm structure having a second end pivotally connected to the actuator handle at a wrist pivot, the crank pivot and the wrist pivot pivoting on respective axes oriented orthogonally to the longitudinal axis, the wrist pivot being slideable with respect to the module housing in the direction of the longitudinal axis between a crank latched position and a crank delatched position in response to the actuator handle sliding between the handle latched position and the handle delatched position, the pin being movable in a direction substantially orthogonal to the longitudinal axis and the respective axes of the crank pivot and the wrist pivot between a pin latched position and a pin delatched position in response to the wrist pivot sliding between the crank latched position and the crank delatched position.

6. The data communication module of claim 5, further comprising a return spring having a first portion fixedly connected to the module housing and a second portion abutting a portion of the T-shaped crank.

7. The data communication module of claim 5, wherein the first arm structure is substantially U-shaped with a cross member and two arms, the two arms of the first arm structure are connected to the crank pivot, and the pin extends from the cross member.

8. The data communication module of claim 7, wherein the second arm structure comprises two arms, and each of the two arms of the second arm structure is connected to a corresponding one of the two arms of the first arm structure.

9. A method for delatching a data communication module from a cage, the data communication module comprising module electronics, a module housing elongated in a direction of a longitudinal axis, an actuator handle, and a substantially T-shaped crank, the method comprising:
sliding the actuator handle in the direction of the longitudinal axis from a handle latched position to a handle delatched position, the actuator handle having a shape elongated in the direction of the longitudinal axis; and
the substantially T-shaped crank pivoting on a crank pivot from a crank latched position to a crank delatched position in response to sliding the actuator handle, the T-shaped crank having a first arm structure and a second arm structure substantially perpendicular to the first arm structure, the first arm structure having a first end pivotally connected to the module housing at the crank pivot and a second end having a pin extending therefrom, the second arm structure having a first end fixedly connected to a portion of the first arm structure between the first end of the first arm structure and the second end of the first arm structure, the second arm structure having a second end pivotally connected to the actuator handle at a wrist pivot, the pin retracting toward the module housing from a pin latched position wherein the pin engages a portion of the cage to a pin delatched position wherein the pin disengages from the portion of the cage in response to the substantially T-shaped crank pivoting on the crank pivot.

10. The method of claim 9, further comprising:
extracting the data communication module from the cage;
releasing the actuator handle; and
a return spring connected to the module housing and the T-shaped crank resiliently urging the substantially T-shaped crank from the crank delatched position in response to releasing the actuator handle.

11. The method of claim 9, wherein the first arm structure is substantially U-shaped with a cross member and two arms, the two arms of the first arm structure are connected to the crank pivot, and the pin extends from the cross member.

12. The method of claim 11, wherein the second arm structure comprises two arms, and each of the two arms of the second arm structure is connected to a corresponding one of the two arms of the first arm structure.

* * * * *